(12) United States Patent
Tomomasa (10) Patent No.: US 9,013,652 B2
(45) Date of Patent: Apr. 21, 2015

(54) LIGHTING DEVICE AND LIQUID CRYSTAL DISPLAY DEVICE PROVIDED WITH SAME

(75) Inventor: Masatoshi Tomomasa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 50 days.

(21) Appl. No.: 13/991,374

(22) PCT Filed: Nov. 29, 2011

(86) PCT No.: PCT/JP2011/077512
§ 371 (c)(1),
(2), (4) Date: Jun. 3, 2013

(87) PCT Pub. No.: WO2012/077534
PCT Pub. Date: Jun. 14, 2012

(65) Prior Publication Data
US 2013/0250213 A1    Sep. 26, 2013

(30) Foreign Application Priority Data
Dec. 6, 2010 (JP) ................................. 2010-271069

(51) Int. Cl.
*G02F 1/1333* (2006.01)
*F21V 8/00* (2006.01)
*G02F 1/1335* (2006.01)

(52) U.S. Cl.
CPC ............ *G02B 6/0091* (2013.01); *G02B 6/0078* (2013.01); *G02B 6/0088* (2013.01); *G02F 1/133615* (2013.01)

(58) Field of Classification Search
USPC ...................................... 349/65, 58
See application file for complete search history.

(56) References Cited

U.S. PATENT DOCUMENTS

| 6,175,396 B1 * | 1/2001 | Kim et al. ....................... 349/58 |
| 8,172,447 B2 * | 5/2012 | Meir et al. ..................... 362/616 |
| 2009/0073346 A1 * | 3/2009 | Mikami .......................... 349/65 |

FOREIGN PATENT DOCUMENTS

JP    2001-92370 A    4/2001

* cited by examiner

*Primary Examiner* — James Dudek
(74) *Attorney, Agent, or Firm* — Chen Yoshimura LLP (57) ABSTRACT

Provided is an illumination device capable of housing and fixing a plurality of light guide plates inside a chassis. The illumination device has a rectangular box-shaped chassis, a plurality of horizontally long rectangular light guide plates that are housed inside the chassis while arranged side by side on the bottom surface, light sources that emit light to the shorter side end faces of the respective light guide plates such that the light enters the respective light guide plates, and a plurality of support members that clamp the respective light guide plates on the bottom surface of the chassis. Each support member has a holding part that makes contact with upper surfaces of respective light guide plates at the long-side edges, a shank extending from the holding part, and a pair of locking pieces elastically deformable toward and away from each other, the pair of locking pieces being provided at an end of the shank and being inserted and engaged in an attachment hole in the bottom plate.

5 Claims, 9 Drawing Sheets

LIGHTING DEVICE AND LIQUID CRYSTAL DISPLAY DEVICE PROVIDED WITH SAME

TECHNICAL FIELD

The present invention relates to an illumination device used as a light source for a liquid crystal television and the like, and a liquid crystal display device provided with the illumination device. More particularly, the present invention relates to an illumination device having a plurality of light guide plates, and a liquid crystal display device provided with the illumination device.

BACKGROUND ART

In recent years, liquid crystal display devices are widely used as display units for computers and home appliances such as televisions. Generally, a liquid crystal display device includes a liquid crystal display panel and an illumination device (backlight device) that is disposed on the rear side the liquid crystal display panel to illuminate light thereto. As this type of illumination device, a side-light type (edge-light type) illumination device is known. The side-light type illumination device includes a light guide plate and light sources provided along one side or a plurality of sides of the light guide plate. Such a side-light type illumination device has greater advantages such as being made thinner with ease, as compared with a direct-light type illumination device in which the light source is disposed on the rear side of the liquid crystal display panel.

In particular, a side-light type illumination device that uses an LED (light-emitting diode) as a light source is drawing attention for having advantages such as a longer life and a higher light-emitting efficiency.

Figure 7:
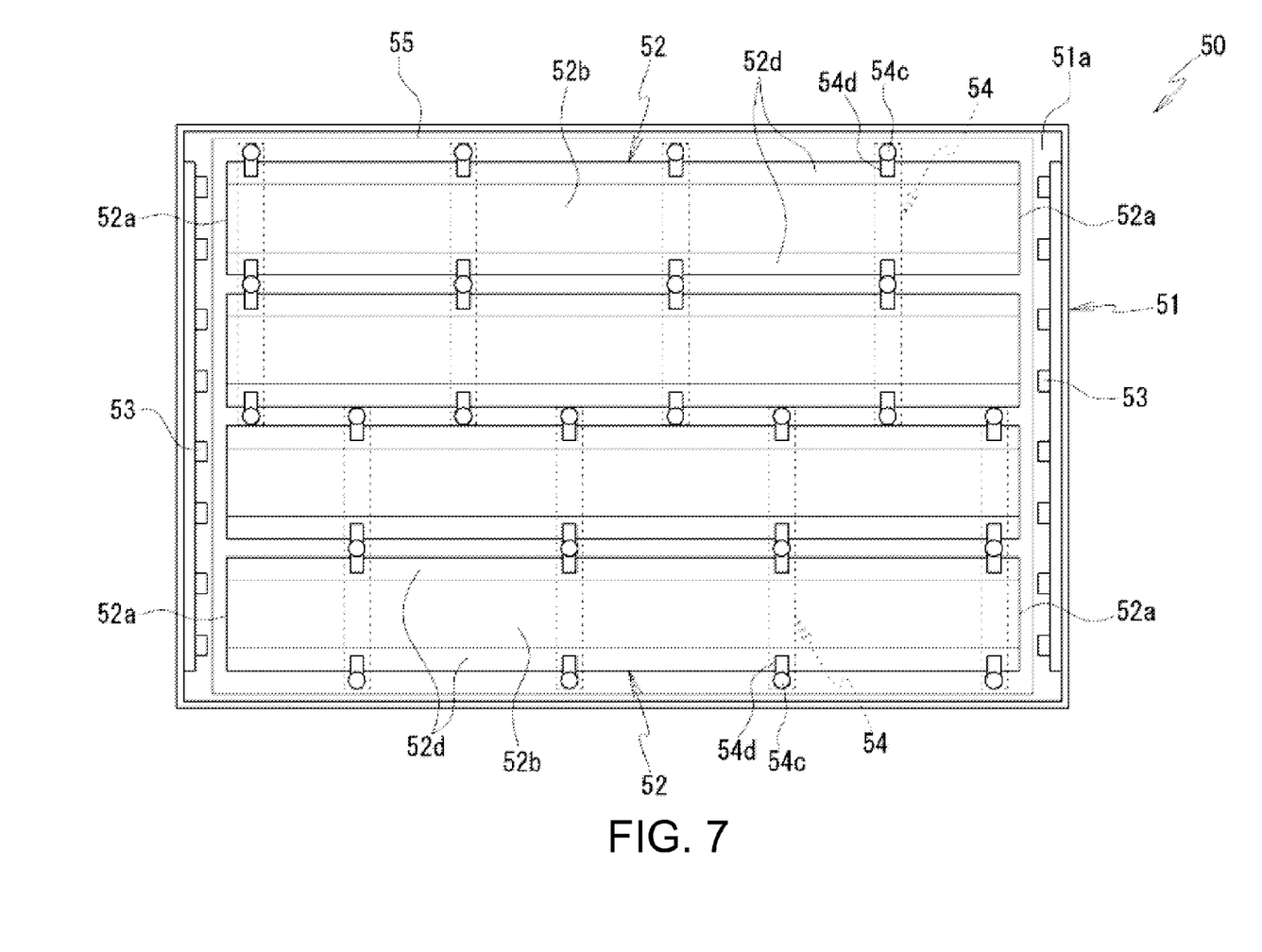
FIG. 7 is a top view of an illumination device having a divided light guide plate that is used in a conventional configuration.
Figure 8:
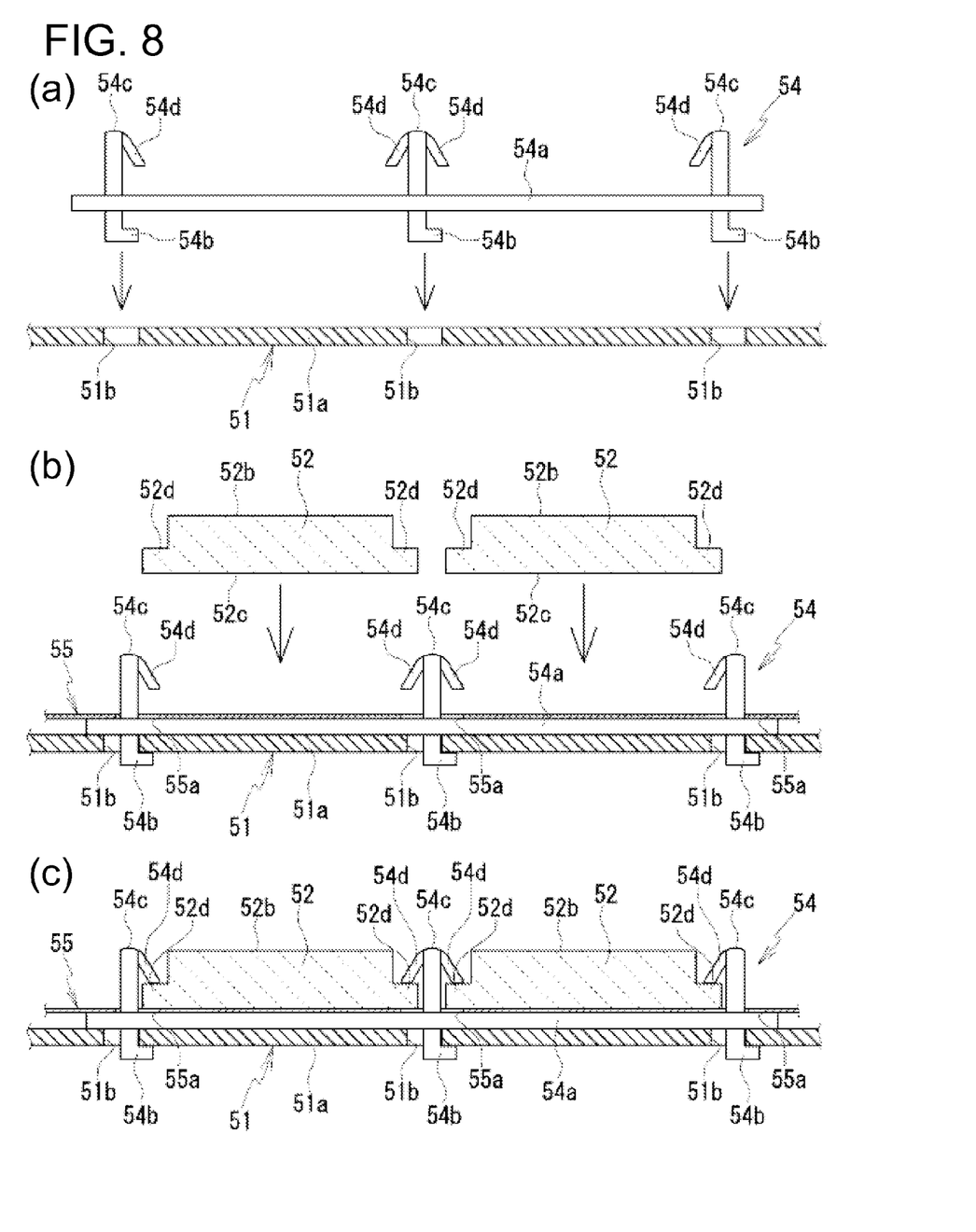
FIG. 8 show cross-sectional views illustrating assembly steps of the illumination device of FIG. 7.

Conventionally, in the side-light type illumination device, a so-called scanning type light-emitting method has been proposed to mitigate a deterioration in image quality such as moving images being blurry when displaying moving images in the liquid crystal display device. In the scanning type light-emitting method, the illumination device is divided into a plurality of regions, and the plurality of divided regions are sequentially caused to emit light. FIG. 7 is a front view showing a schematic configuration of an illumination device used for such a scanning type light-emitting method, and FIG. 8 shows cross-sectional views illustrating assembly steps for components of the illumination device.

As shown in the figures, an illumination device 50 includes a chassis 51 that is formed in a shallow box shape, and in the chassis 51, a plurality of light guide plates 52 having a rectangular shape longer in the horizontal direction are stored while arranged along the short side direction. At the side end faces of the respective light guide plates 52, a plurality of LEDs 53 that emit white light are disposed. Each light guide plate 52 has light-receiving faces 52a through which light from the LEDs 53 enters, and a light-emitting surface 52b that emits light entered through the light-receiving faces 52a upward (in an illumination direction). The light-receiving faces 52a are constituted of side end faces on the shorter sides of the light guide plate 52, and the light-emitting surface 52b is constituted of a front surface of the light guide plate 52. A reflective sheet 55 is disposed to cover rear surfaces 52c of the light guide plates 52 that are on the opposite side to the light-emitting surfaces 52b (see FIGS. 8(b) and 8(c)).

In the illumination device 50 of a divided light guide plate type in which the light guide plate, which is generally constituted of a single plate, is divided into a plurality of parts, in order to improve a problem of blurry moving images in displaying moving images, the LEDs 53 are sequentially lit in the top to bottom direction in synchronization with a scanning signal of a not shown liquid crystal display panel, thereby causing the respective light guide plates 52 to sequentially emit light in the top to bottom direction.

Such light guide plates 52 are fixed to a bottom plate 51a of the chassis 51 by support members 54. As shown in FIG. 8(a), each support member 54 has a plate-shaped base 54a, hooks 54b disposed on the lower surface of the base 54a, and holding parts 54c that rise from the upper surface of the base 54a. At the tip of each holding part 54c, a locking piece 54d that is elastically deformable is disposed so as to extend at a downward angle. In this configuration, steps 52d, 52d are formed along the respective longer side edges of the light guide plate 52. The steps 52d are formed to be recessed from the upper surface (light-emitting surface 52b) of the light guide plate 52.

As shown in FIG. 8(c), the lower ends of the locking pieces 54d of the holding parts 54c make contact with the upper surfaces of the steps 52d of the light guide plates 52 having the above-mentioned configuration. In the bottom plate 51a of the chassis 51, attachment holes 51b are formed, and the hooks 54b of the support members 54 are inserted and engaged in the attachment holes 51b.

Steps to store and fix the plurality of light guide plates 52 into the chassis 51 in the above-mentioned illumination device 50 will be explained with reference to FIG. 8. As shown in FIG. 8(a), first, the hooks 54b of the support member 54 are engaged in the attachment holes 51b in the bottom plate 51a of the chassis 51, thereby fixing the support member 54 to the bottom plate 51a of the chassis 51 in a prescribed position.

Next, as shown in FIG. 8(b), the reflective sheet 55 is placed on the base 54a of the support member 54. The reflective sheet 55 has openings formed therein as inserting holes 55a through which the holding parts 54c of the support member 54 can be inserted. By inserting the holding parts 54c of the support member 54 through these inserting holes 55a, the reflective sheet 55 is fixed in a prescribed position on the bottom plate 51a of the chassis 51. Thereafter, by lowering the light guide plates 52 in proper positions between adjacent holding parts 54c, 54c of the support member 54, as shown in FIG. 8(c), the holding parts 54c, 54c of the support members 54 engage the steps 52d, 52d of the light guide plates 52, and as a result, the light guide plates 52 are fixed in prescribed positions. Related art documents for the present invention include Patent Document listed below.

RELATED ART DOCUMENT

Patent Document

Patent Document 1 Japanese Patent Application Laid-Open Publication No. 2001-92370

SUMMARY OF THE INVENTION

Problems to be Solved by the Invention

Figure 9:
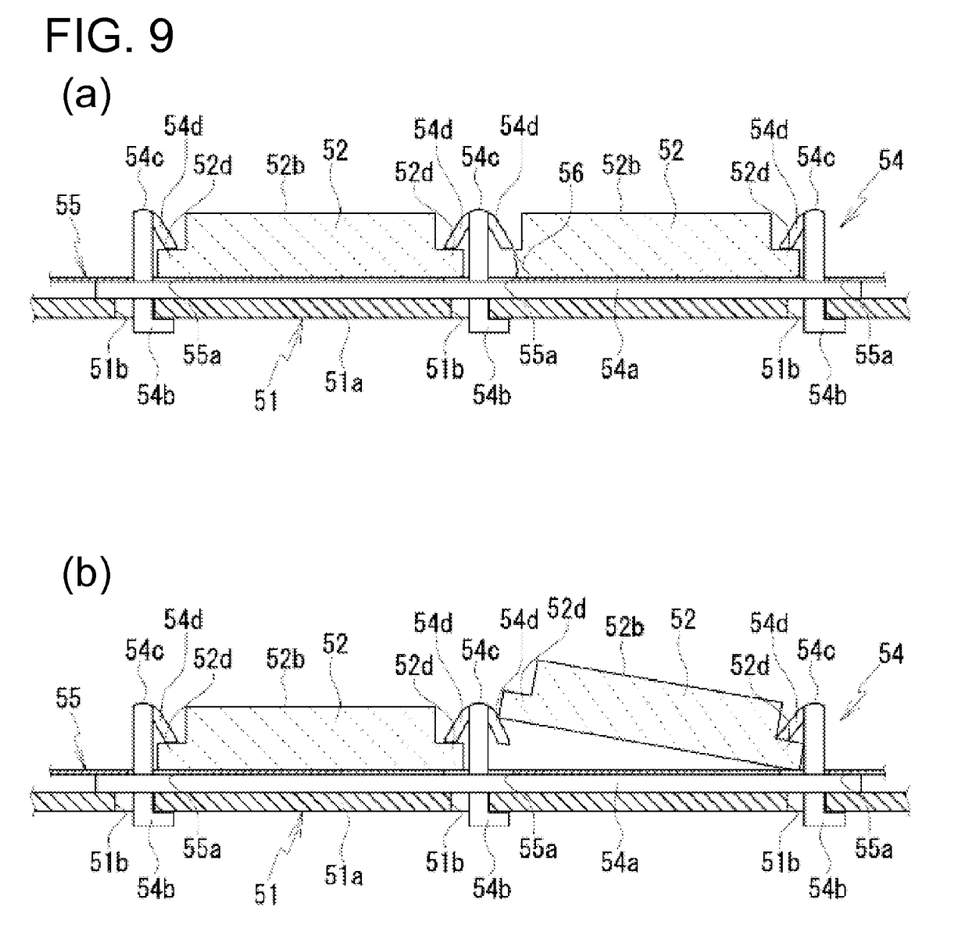
FIG. 9 show cross-sectional views illustrating problems that occur in the assembly process of the illumination device of FIG. 7.

However, as shown in FIG. 8(b), there was a problem that, when the light guide plates 52 are lowered, and when the steps 52d are passing by the locking pieces 54d of the holding parts 54c while pressing the locking pieces 54d inward, a crack or chip 56 was formed in the step 52d as shown in FIG. 9(a) due to an excessive force applied by the locking pieces 54d. Also, as shown in FIG. 9(b), there was a problem that the illumination device 50 was assembled while one of the steps 52d of the light guide plate 52 is riding on a locking piece 54d of a holding part 54c.

An object of the present invention is to provide an illumination device in which a plurality of light guide plates can be stored and fixed with ease in a chassis having a rectangular box shape by using a simple structure when storing and fixing the plurality of light guide plates arranged side by side in the chassis, and a liquid crystal display device provided with the illumination device.

Means for Solving the Problems

In order to solve the above-mentioned problems, the present invention includes: a chassis that is in a rectangular box shape; a plurality of light guide plates having a rectangular shape that is longer in a horizontal direction, the plurality of light guide plates being stored in the chassis and being arranged side by side on an inner bottom surface of the chassis; light sources that illuminate light to shorter side end faces of the respective light guide plates such that the light enters the respective light guide plates; and a plurality of support members that clamp the respective light guide plates on a surface of a bottom plate of the chassis, wherein each of the support members has a holding part, a shank extending from the holding part, and a pair of locking pieces provided at an end of the shank, the holding part making contact with an upper surface of a longer side edge of each of the light guide plates, the pair of locking pieces being inserted and engaged in an attachment hole in the bottom plate and being elastically deformable toward and away from each other.

With the illumination device having such a configuration, the light guide plates can be fixed on the bottom plate of the chassis by placing the light guide plates on the bottom plate of the chassis and attaching the support members to the bottom plate of the chassis. Therefore, it is possible to stored and fix the plurality of light guide plates in the chassis with ease. Also, because it is possible to prevent an excessive force from being applied to the edge of the light guide plate from the holding part of the support member, damage is not made to the light guide plate when attaching the support member.

In this case, it is preferable that the bottom plate of the chassis and each of the light guide plates both have a positioning hole for defining positions with respect to each other, and that, by inserting a positioning pin into both of the positioning holes, each of the light guide plates be fixed in a proper position on the surface of the bottom plate of the chassis. With this configuration, before attaching the support member, the position of the light guide plate with respect to the bottom plate of the chassis can be defined. Therefore, the support members can be attached to the bottom plate of the chassis with ease, and also, after the support members are attached, it is possible to prevent the light guide plates from moving from proper positions with respect to the chassis.

It is preferable that the pair of locking pieces of the support member be configured so as to face each other along the longer side direction of the light guide plate. With this configuration, it is possible to arrange the respective light guide plates such that a gap between adjacent light guide plates is made smaller than when the pair of locking pieces of the support member is formed such that the lengthwise direction thereof intersects with the lengthwise direction of the light guide plate, thereby contributing to a size increase of each light guide plate or a size reduction of the illumination device.

Furthermore, it is preferable that a plurality of support members be connected to each other by a connector along the lengthwise direction of the light guide plates. With this configuration, the plurality of support members can be attached to the bottom plate of the chassis with a greater ease than when the plurality of support members are to be attached one by one. In addition, it is possible to contribute to a reduction in number of constituting components of the illumination device.

It is preferable that a step be formed along each longer side edge of the light guide plate where an edge of an upper surface is removed and a recess is formed, that the holding part of each of the support members make contact with an upper surface of the step, and that the light guide plate and the bottom plate of the chassis be held by a pressure between the holding part and the pair of locking pieces. With this configuration, it is possible to prevent the holding part of the support member from protruding beyond the upper surface (light-emitting surface) of the light guide plate, thus contributing to a size reduction of the illumination device in the thickness direction (thickness reduction). In addition, in a case in which an optical sheet is to be stacked (placed) on the upper surfaces of the light guide plates, it is possible to prevent the optical sheet from being warped (having wrinkles).

In order to solve the above-mentioned problems, the liquid crystal display device of the present invention includes the above-mentioned illumination device and a liquid crystal display panel that displays an image by using light from the illumination device. With such a liquid crystal display device, the assembly process of the illumination device is made easier, and therefore, it is possible to contribute to a reduction in manufacturing cost of the liquid crystal display device.

Effects of the Invention

According to the present invention having the above-mentioned configuration, the light guide plates can be fixed on the bottom plate of the chassis by arranging the light guide plates side by side on the bottom plate of the chassis, and by thereafter attaching the support members to the bottom plate of the chassis. Therefore, it is possible to store and fix the plurality of light guide plates in the chassis with ease. Also, because it is possible to prevent an excessive force from being applied to an edge of each light guide plate from the holding part of the support member, damage is not made to the light guide plate when attaching the support members.

DETAILED DESCRIPTION OF EMBODIMENTS

Below, an embodiment of an illumination device and a liquid crystal display device according to the present invention will be explained in details with reference to figures.

Figure 1:
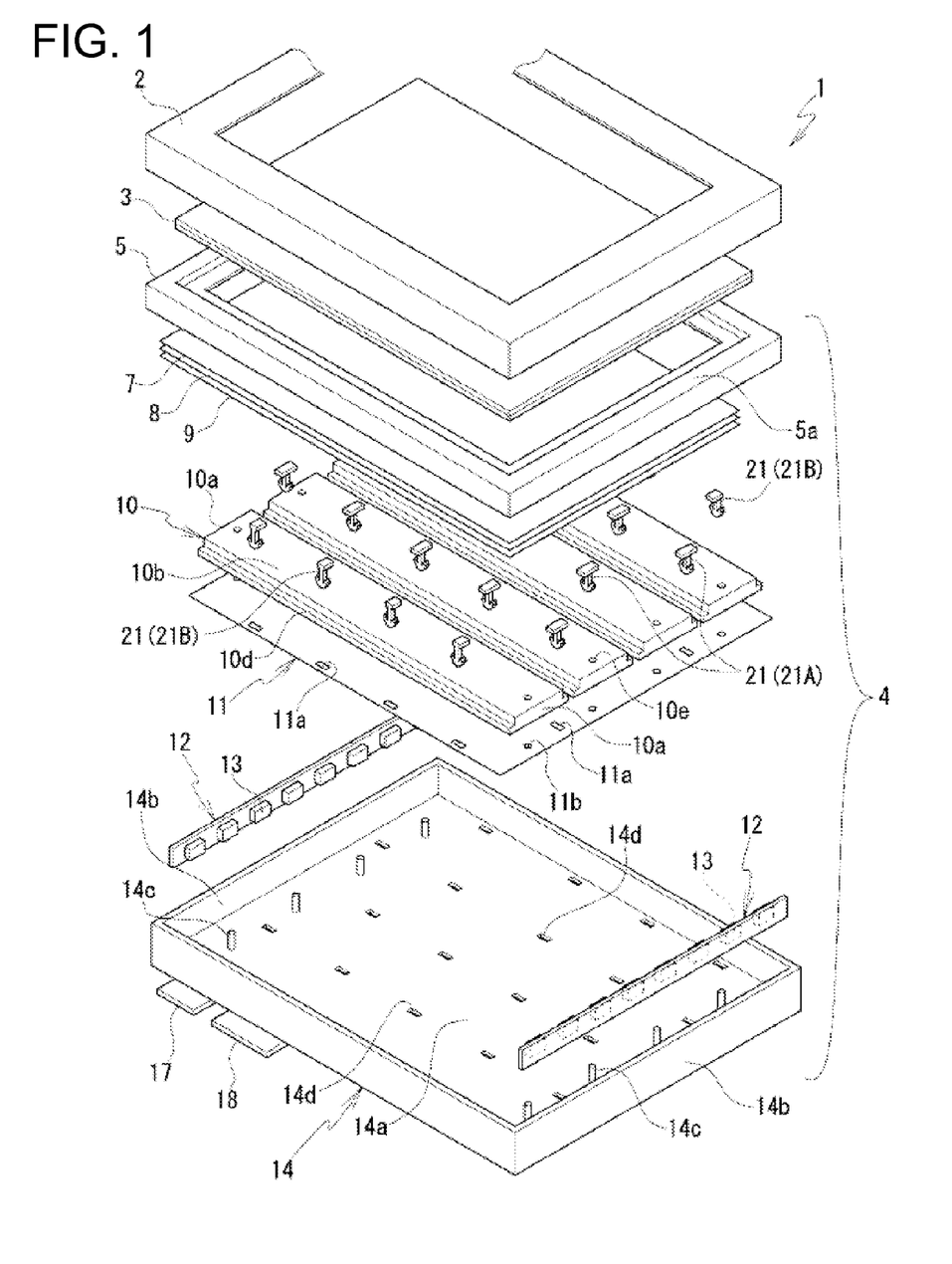
FIG. 1 is an exploded perspective view of a schematic configuration of a liquid crystal display device of one embodiment of the present invention.
Figure 2:
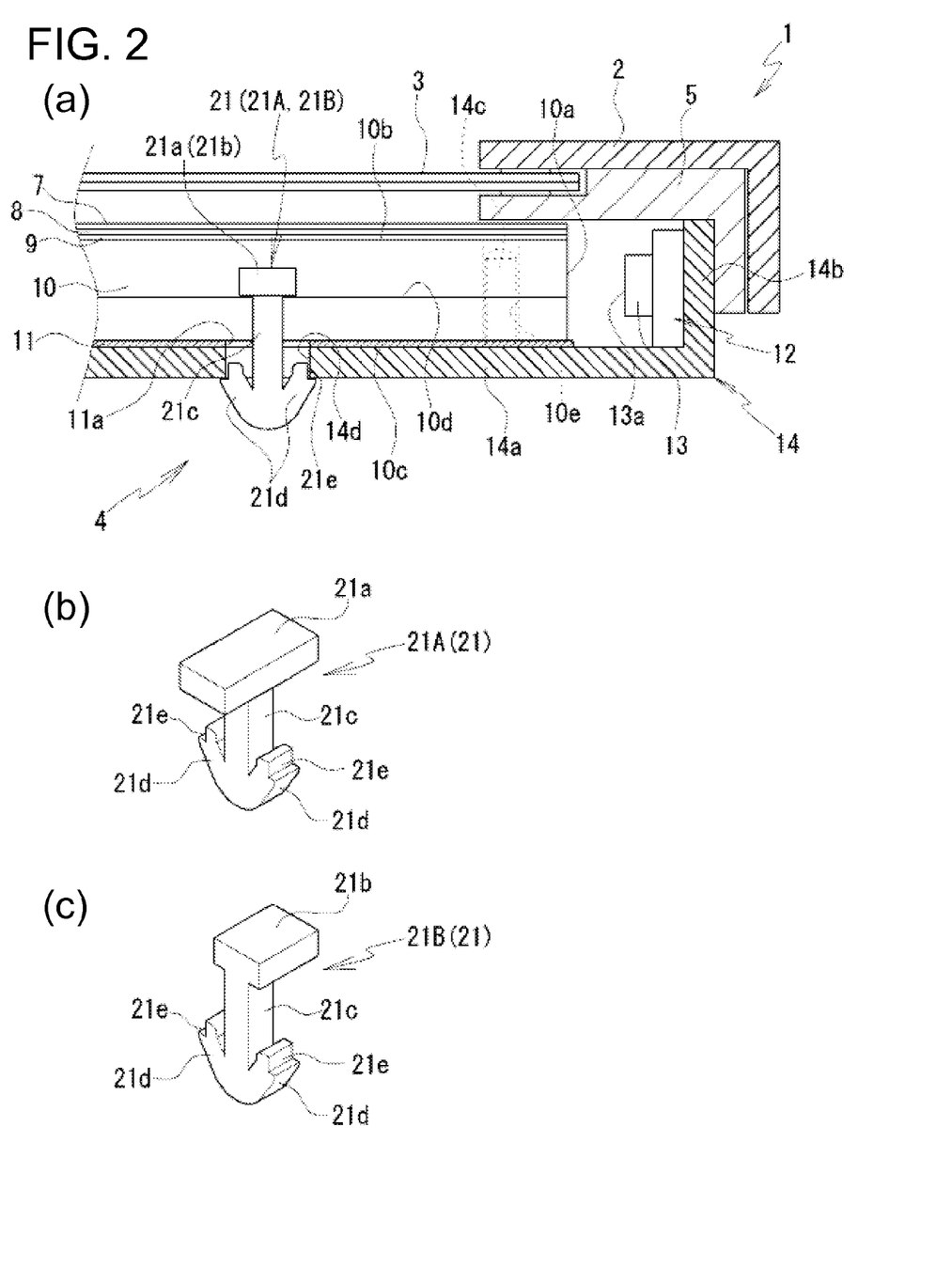
FIG. 2(a) is an enlarged cross-sectional view of a main part of the liquid crystal display device of FIG. 1 after assembly.
FIG. 2(b) is an exterior perspective view showing a schematic configuration of a first support member.
FIG. 2(c) is an exterior perspective view showing a schematic configuration of a second support member.

FIG. 1 is an exploded perspective view schematically showing a liquid crystal display device of one embodiment of the present invention, and FIG. 2(a) is an enlarged cross-sectional view of a main part of the liquid crystal display device of FIG. 1 after assembly. As shown in the figures, a liquid crystal display device 1 includes a liquid crystal display panel 3 and an illumination device (backlight device) 4 that illuminates the liquid crystal display panel 3, and these components are held as one component by a frame-shaped bezel 2 and the like. The bezel 2 has a frame shape that covers outer edges of the liquid crystal display panel 3, and is provided to ensure an overall strength of the liquid crystal display device 1 along with a chassis 14 provided in the illumination device 4.

The liquid crystal display panel 3 has a rectangular shape that is longer in the horizontal direction in a plan view. The liquid crystal display panel 3 has a configuration in which a pair of glass substrates, which includes a thin film transistor (TFT) array substrate and a color filter (CF) substrate, is bonded in parallel with each other with a prescribed gap therebetween, and liquid crystal is sealed between the two glass substrates.

The TFT array substrate includes a plurality of TFTs and pixel electrodes arranged in a matrix. The CF substrate includes a plurality of colored patterns arranged in a matrix, and a common electrode covering the substantially entire surface thereof. An image can be displayed by changing a voltage applied between these pixel electrodes and the common electrode to control the orientation of the liquid crystal. Polarizing plates are each formed on a front surface and a rear surface of the liquid crystal display panel 3.

The illumination device 4 is a so-called side-light type (edge-light type) illumination device. As shown in the figures, the illumination device 4 includes the chassis 14 that has a substantially box shape and that opens on the side facing the liquid crystal display panel 3, and optical sheets 7 to 9 disposed covering the opening of the chassis 14. The chassis 14 therein includes LED substrates 12 where a plurality of LEDs (light-emitting diodes) 13 that are light sources are mounted, a plurality of light guide plates 10 that guide light from the LEDs 13 to the liquid crystal display panel 3, and a reflective sheet 11 disposed on the rear side of the light guide plates 10.

A frame 5 is attached to the chassis 14 over the optical sheet 7 to 9, the light guide plate 10, and the reflective sheet 11 stacked in this order from the top. In this case, the frame 5 is formed in a frame shape that extends along the outer edges of the optical sheets 7 to 9, and can hold the almost entire outer edges of the optical sheets 7 to 9 from the front side. The frame 5 is made of a metal painted in black or a black synthetic resin, for example, thereby having a light-shielding property. Also, on the upper surface of a frame portion 5a of the frame 5, a part of the rear surface of the liquid crystal display panel 3 along the outer edges is disposed.

The chassis 14 is a shallow box shape component formed of a metal plate such as an aluminum plate through a bending process or the like, and can therein contain the optical sheets 7 to 9, the plurality of light guide plates 10, the reflective sheet 11, and the LED substrates 12, 12. The chassis 14 has a bottom plate 14a that has a rectangular shape longer in the horizontal direction in a plan view, and side plates 14b that rise from the four outer edges of the bottom plate 14a. The frame 5 and the bezel 2 described above can be fixed to the side plates 14b with screws.

The three optical sheets 7 to 9 are each made of a thin resin sheet that has a rectangular shape longer in the horizontal direction in a plan view. The optical sheets 7 to 9 are placed on the front side (light-emitting side) of the plurality of light guide plates 10 arranged side by side, and are interposed between the liquid crystal display panel 3 and these light guide plates 10. The optical sheets 7 to 9 includes a polarization selective reflective sheet 7, a lens sheet 8, and a diffusion sheet 9 each having a thickness of about 0.1 to 0.5 mm, for example, in this order from the top.

In this case, the diffusion sheet 9 is provided to diffuse light emitted from the light guide plates 10, thereby achieving a uniform brightness distribution. The lens sheet 8 converges light emitted from the diffusion sheet 9, thereby enhancing the brightness on the front surface. The polarization selective reflective sheet 7 selectively reflects light emitted from the lens sheet 8 to prevent the light from being absorbed by a not-shown polarizing plate attached to the rear surface of the liquid crystal display panel 3.

The light guide plate 10 has a rectangular shape longer in the horizontal direction in a plan view, and is made of a transparent resin plate such as an acryl plate having a thickness of about 3 to 4 mm, for example. In this case, a plurality of light guide plates 10 (four light guide plates 10 in the present embodiment) are arranged side by side along the shorter side direction. Each light guide plate 10 has light-receiving faces 10a through which light from the LEDs 13 enters, and a light-emitting surface 10b that emits light entering through the light-receiving faces 10a upward (in an illumination direction). The light-receiving faces 10a are constituted of side end faces along the shorter sides of the light guide plate 10, and the light-emitting surface 10b is constituted of a front surface of the light guide plate 10.

In the light guide plate 10, light that entered through the light-receiving faces 10a is repeatedly reflected off of the light-emitting surface (front surface) 10b and a rear surface 10c on the side opposite to the light-emitting surface 10b, thereby converting the light to planar light inside of the light guide plate 10. Although not shown in the figures, on the rear surface 10c of the light guide plate 10, a plurality of diffusion parts are formed to diffuse the light that entered through the light-receiving faces 10a, which is thereafter emitted from the light-emitting surface 10b. Such diffusion parts can be formed by printing in a dot pattern a paint that includes a white pigment and the like on the rear surface 10c of the light guide plate 10, for example.

In this configuration, steps 10d, 10d are formed along the respective longer side edges of the light guide plate 10. The steps 10d are formed to be recessed from the upper surface (light-emitting surface 10b) of the light guide plate 10. At the respective ends on the shorter sides of the light guide plate 10, openings that penetrate the light guide plate 10 along the thickness direction are formed as positioning holes 10e, 10e, and the bottom plate 14a of the chassis 14 has positioning pins 14c, 14c formed thereon so as to correspond to the positioning holes 10e, 10e.

A plurality of LEDs 13 provided on the LED substrates 12 are disposed near the light-receiving faces 10a of the light guide plates 10. Each LED 13 has a package structure in which an LED chip that emits blue light, for example, is sealed by a transparent resin having a yellow fluorescent material mixed therein, and the LED 13 can emit white light from a light-emitting surface 13a thereof. The LEDs 13 are disposed at prescribed intervals along the light-receiving faces 10a of the light guide plate 10 such that the light-emitting surfaces 13a thereof face the light-receiving faces 10a. In this case, two LED substrates 12 are disposed such that the light-emitting surfaces 13a of the LEDs 13 face the end faces on the shorter sides (light-receiving faces 10a, 10a) of the respective light guide plates 10.

The reflective sheet 11 is disposed covering the rear surfaces 10c of the respective light guide plates 10, and in this case, the reflective sheet 11 is placed on the bottom plate 14a of the chassis 14. The reflective sheet 11 is provided to reflect light emitted from the rear surfaces 10c of the light guide plates 10 back to the light guide plates 10, and is made of a resin sheet having a thickness of about 0.1 to 2 mm, for example. In this case, the front surface of the reflective sheet 11 is painted white, for example, so as to efficiently reflect light emitted from the rear surfaces 10c of the light guide plates 10 back to the light guide plates 10, thereby improving the light utilization efficiency and the brightness at the light-emitting surfaces 10b of the light guide plates 10.

Figure 4:
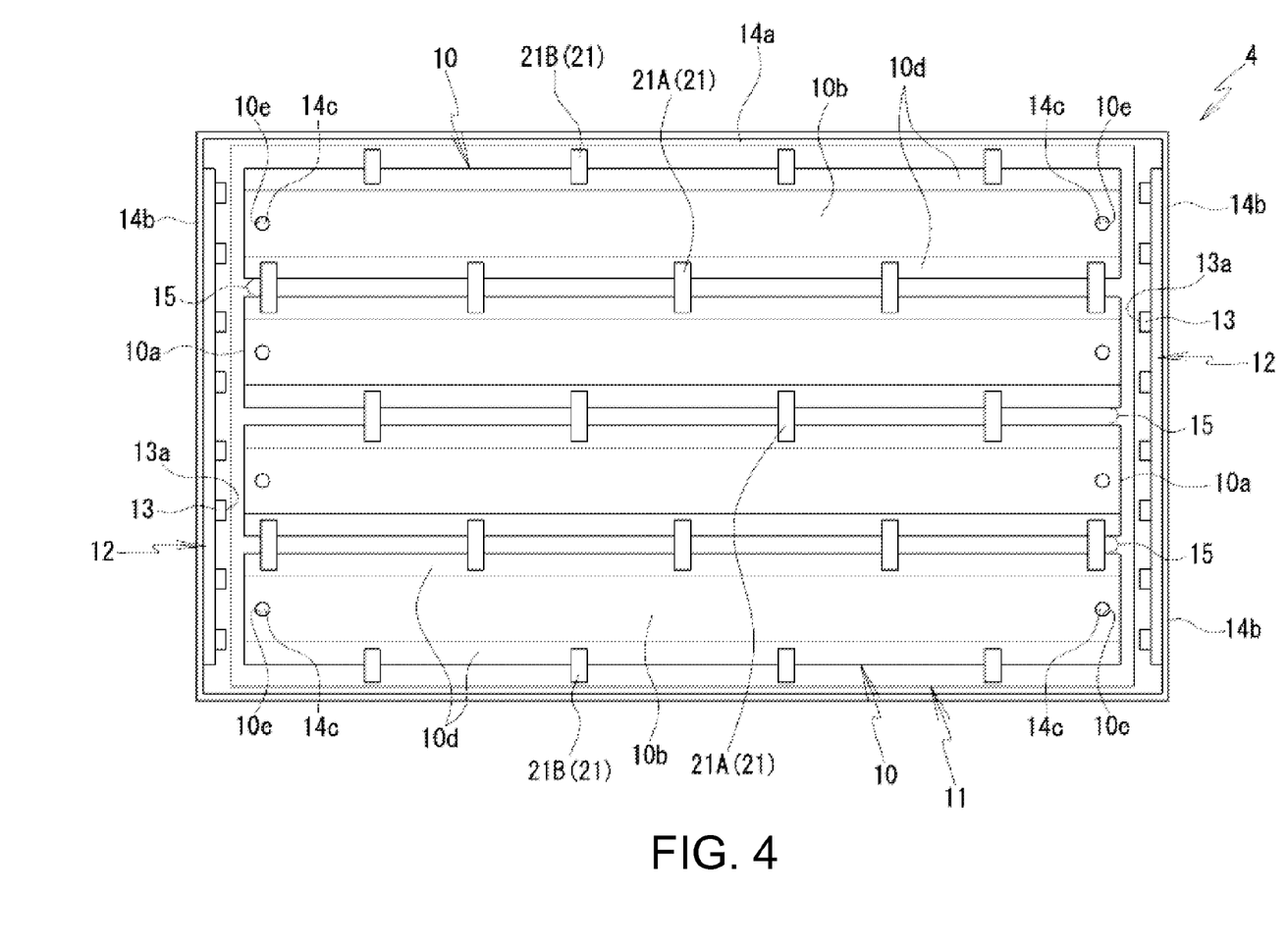
FIG. 4 is a top view of the illumination device.

As described above, by having the optical sheets 7 to 9, the plurality of light guide plates 10, and the reflective sheet 11, the illumination device 4 can convert light from the LEDs 13 to planar light and radiate the light to the rear surface of the liquid crystal display panel 3. On the rear surface of the chassis 4, a power source substrate 17 that supplies power to the LED substrates 12, and a control board 18 that drives the liquid crystal display panel 3 are provided. In the illumination device 4 described above, in order to improve the problem of blurry moving images in displaying moving images in the liquid crystal display panel 3, the LEDs 13 are sequentially lit in the top to bottom direction by the power source substrate 17 as shown in FIG. 4 in synchronization with a signal of the control board 18 that drives the liquid crystal display panel 3 (scanning signal), thereby causing the respective light guide plates 10 to sequentially emit light in the top to bottom direction.

The plurality of light guide plates 10 described above are fixed to the bottom plate 14a of the chassis 14 by a plurality of support members 21 (21A, 21B). In this case, as shown in FIG. 4, the plurality of support members 21 (21A, 21B) are arranged in a staggered pattern so as not to align with each other in the vertical direction (direction in which the plurality of light guide plates 10 are arranged). This makes it possible to make a shadow of a portion that is shielded from light by the support members 21 (21A, 21B) less noticeable.

FIG. 2(b) is an exterior perspective view of a first support member 21A that is disposed in a gap 15 between adjacent light guide plates 10, 10 and that supports the longer side edges (steps 10d, 10d) of the light guide plates 10, 10. FIG. 2(c) is an exterior perspective view of a second support member 21B that is disposed on an outer side of an outer long side edge (one of the steps 10d) of one of the two outermost light guide plates 10. The second support member 21B supports a longer side edge (one of the steps 10d) of one of such light guide plates 10.

As shown in the figure, the first support member 21A has a holding part 21a having a flat plate shape, a shank 21c that extends downward from the center of the lower surface of the holding part 21a, and a pair of locking pieces 21d, 21d disposed at the leading end (lower end) of the shank 21c. The holding part 21a has a size (length and area) that allows it to press the respective upper surfaces of the steps 10d, 10d of respective adjacent light guide plates 10, 10 from above. As shown in FIGS. 2(a) and 5(c), the thickness of the holding part 21a is smaller than the depth of the step 10d of the light guide plate 10 from the light-emitting surface (top surface) 10b, so as not to protrude beyond the light-emitting surface 10b of the light guide plate 10. The shank 21c has a diameter that is slightly smaller than the gap 15 between each adjacent light guide plates 10, 10.

The second support member 21B has a similar configuration as that of the first support member 21A, and the holding part 21b having a flat plate shape is smaller than the holding part 21a of the first support member 21A.

Figure 3:
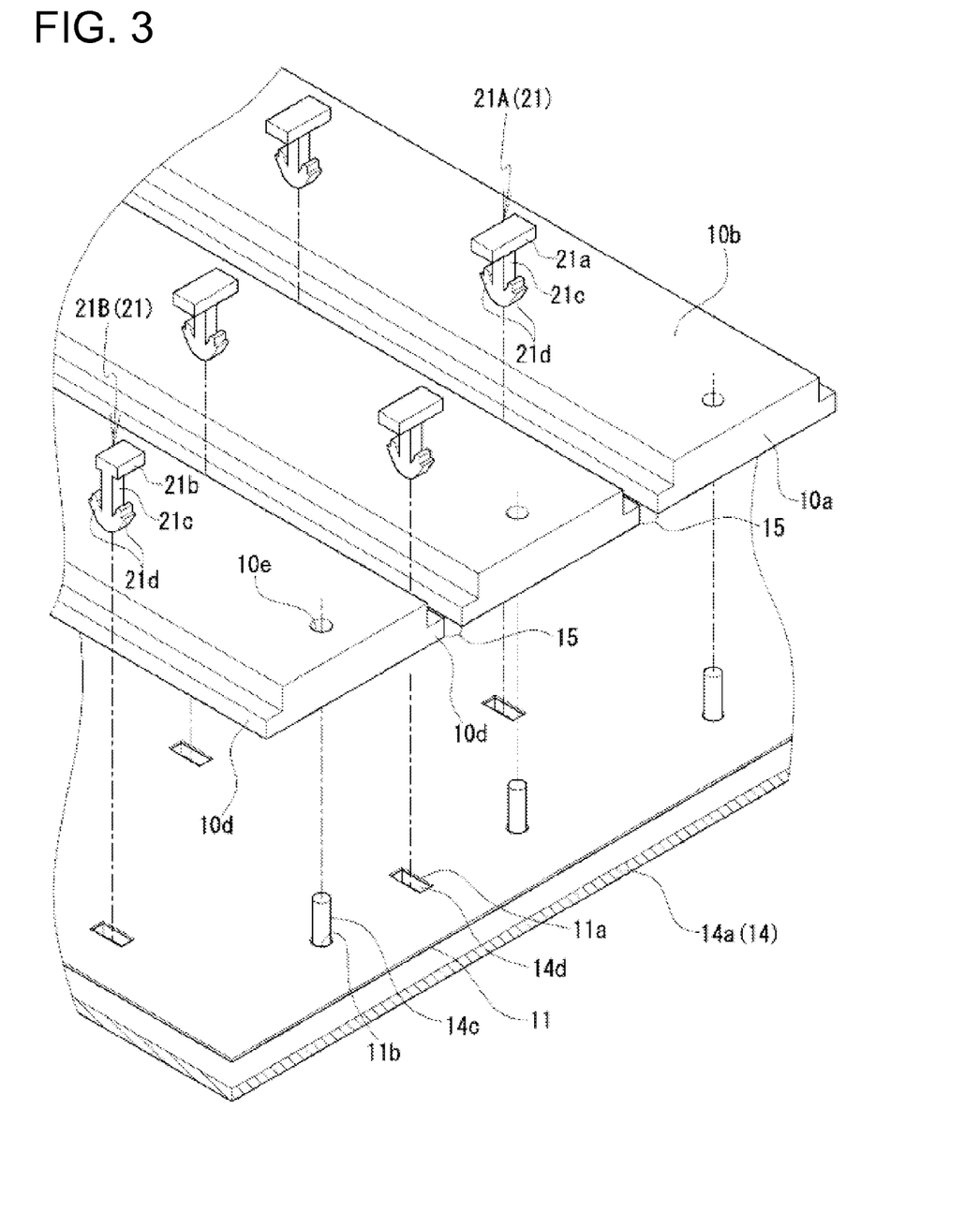
FIG. 3 is an exploded perspective view that shows an enlarged view of a main part of the illumination device of FIG. 1.

Pairs of locking pieces 21d, 21d provided in the first support member 21A and the second support member 21B are formed such that the lengthwise direction thereof coincides with the lengthwise direction of the light guide plate 10. As shown in FIG. 3, the pairs of locking pieces 21d, 21d go through inserting holes 11a formed as openings in the reflective sheet 11, and are engaged in the attachment holes 14d formed as openings in the bottom plate 14a of the chassis 14. Specifically, the pairs of locking pieces 21d, 21d are each formed so as to extend from the end (lower end) of the shank 21c at an upward angle, and are elastically deformable toward and away from each other. At the outer edges of the locking pieces 21d, 21d, locking steps 21e, 21e are formed.

When such locking pieces 21d, 21d are inserted into the attachment holes 14d of the chassis 14, the locking pieces 21d, 21d are first moved inward, and return to the original state when the locking steps 21e, 21e reach the lower surface of the attachment holes 14d. In this manner, the locking steps 21e, 21e are pressed against the inner walls of each attachment hole 14d. As a result, the locking pieces 21d, 21d of the support members 21 (21A, 21B) are securely attached to the attachment holes 14d of the bottom plate 14a as shown in FIG. 2(a).

The locking pieces 21d, 21d can be detached from the attachment hole 14d with ease by pressing the locking pieces 21d, 21d inward so as to release the locking steps 21e, 21e, and by lifting up the support member 21.

Figure 5:
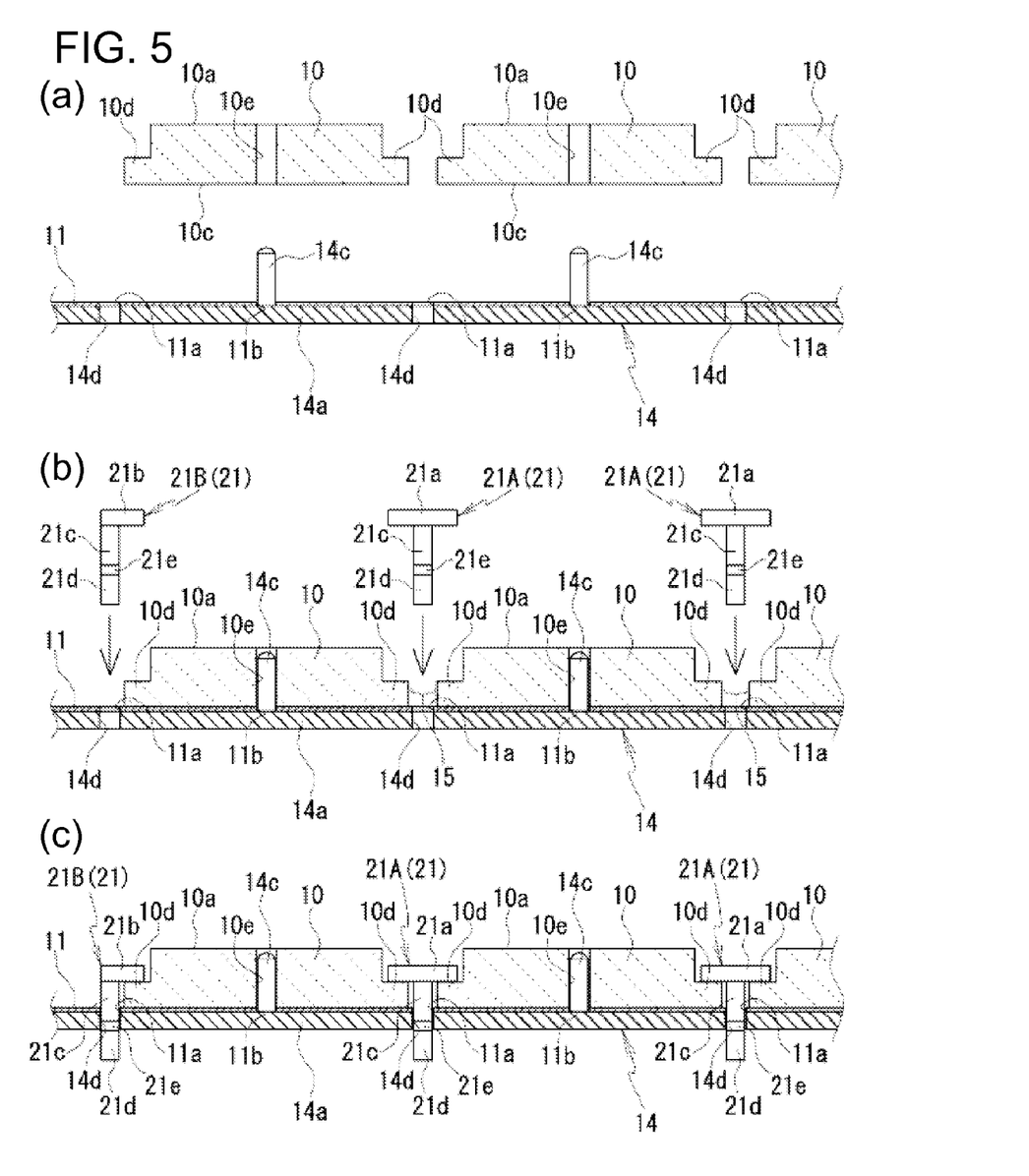
FIG. 5 show cross-sectional views illustrating assembly steps of the illumination device.

Next, with reference to FIG. 5, steps to store and fix the light guide plates 10 into the chassis 14 will be explained. First, as shown in FIG. 5(a), the reflective sheet 11 is placed on the bottom plate 14a of the chassis 14. In this step, by inserting the positioning pins 14c provided on the bottom plate 14 into the positioning holes 11b formed in the reflective sheet 11, respectively, the reflective sheet 11 can be placed in a proper position on the bottom plate 14a. Also, this makes it possible to align the inserting holes 11a of the reflective sheet 11 to the attachment holes 14d of the bottom plate 14a.

Thereafter, as shown in FIG. 5(b), a plurality of light guide plates 10 are placed on the reflective sheet 11. In this step, by inserting the respective positioning pins 14c on the bottom plate 14a into the positioning holes 10e formed in the respective light guide plates 10, the light guide plates 10 can be placed in proper positions on the reflective sheet 11 (bottom plate 14a), and the positions thereof are defined such that a gap 15 between each adjacent light guide plates 10, 10 becomes a prescribed gap. Also, this makes the inserting holes 11a of the reflective sheet 11 and the attachment holes 14d of the bottom plate 14a placed within the respective gaps 15 between adjacent light guide plates 10, 10.

Next, as shown in FIG. 5(b), the support members 21 (21A, 21B) are attached to the bottom plate 14a. When the locking pieces 21d, 21d of each support member 21A is fixed onto an attachment hole 14d of the bottom plate 14a, the shank 21c of the support member 21A is disposed in a gap 15 between each adjacent light guide plates 10, 10, and both ends of the holding part 21a press the upper surfaces of the steps 10d, 10d of the adjacent light guide plates 10, 10 from above. When the locking pieces 21d, 21d of each support member 21B are locked onto an attachment hole 14d of the bottom plate 14a, one end of the holding part 21b presses from above the upper surface of a step 10d of each of the outermost light guide plates 10. In this manner, the light guide plates 10 are supported by the plurality of support members 21 (21A, 21B) that are attached to the bottom plate 14a of the chassis 14 such that the light guide plates 10 are held between the support member 21 and the bottom plate 14a.

According to the above-mentioned illumination device 4, the plurality of light guide plates 10 can be fixed onto the bottom plate 14a of the chassis 14 by placing the plurality of light guide plates 10 on the bottom plate 14a of the chassis 14 and by thereafter attaching the support members 21 (21A, 21B) to the bottom plate 14a. Therefore, it is possible to store and fix the plurality of light guide plates 10 in the chassis 14 with ease. Also, because it is possible to prevent an excessive force from being applied to the edges (steps 10d) of the light guide plates 10 from the holding parts 21a, 21b of the support members 21 (21A, 21B), damage such as a crack or chip is not made to the light guide plates 10 when attaching the support members 21 (21A, 21B).

In this configuration, the bottom plate 14a of the chassis 14 is provided with the positioning pins 14c that define positions of the light guide plates 10. This way, the positions of the light guide plates 10 with respect to the bottom plate 14a of the chassis 14 can be defined before attaching the support members 21 (21A, 21B). Therefore, the support members 21 (21A, 21B) can be attached to the bottom plate 14a with ease, and also, after the support members 21 (21A, 21B) are attached, it is possible to prevent the light guide plates 10 from moving from proper positions with respect to the chassis 14.

Pairs of locking pieces 21d, 21d of the support members 21 (21A, 21B) are formed such that the lengthwise direction thereof coincides with the lengthwise direction of the light guide plates 10. With this configuration, it is possible to arrange the plurality of light guide plates 10 such that a gap 15 between each adjacent light guide plates 10, 10 is made smaller than when the pair of locking pieces 21d, 21d is formed such that the lengthwise direction thereof intersects with the lengthwise direction of the light guide plates 10, thereby contributing to a size increase of each light guide plate 10 or a size reduction of the illumination device 4.

Figure 6:
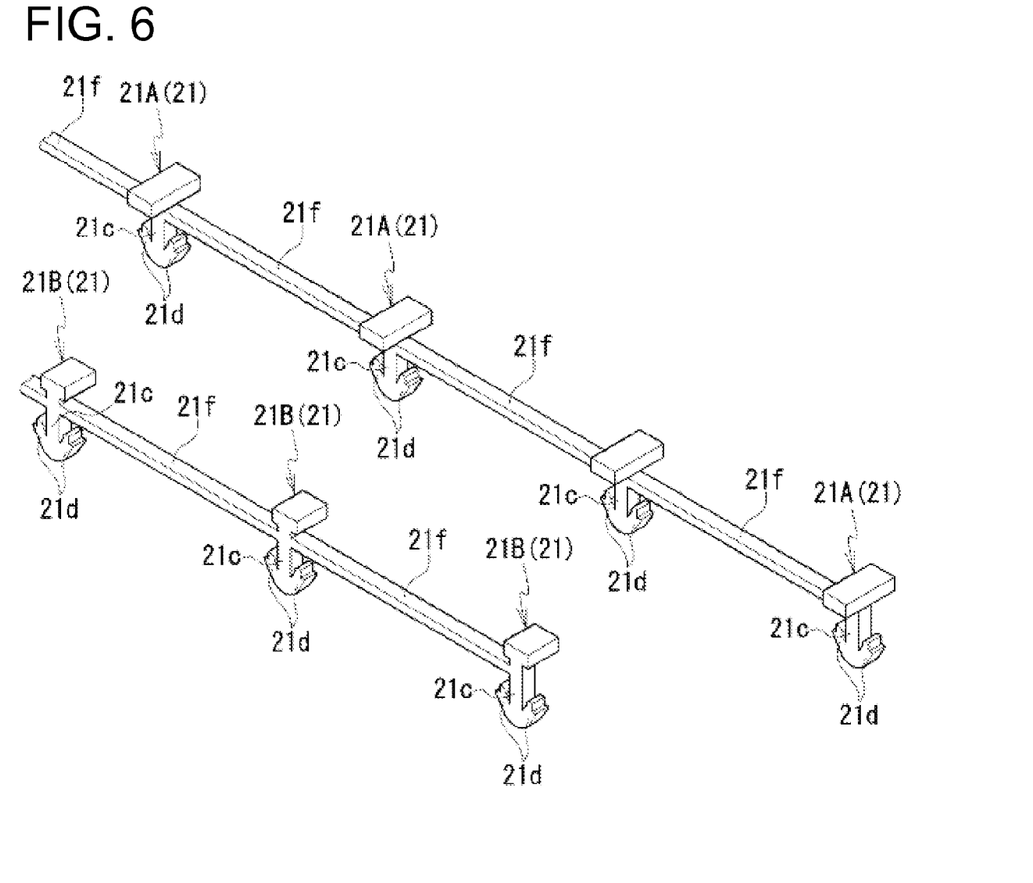
FIG. 6 is an exterior perspective view showing a modification example of the support member.

FIG. 6 shows a modification example of the support members 21 (21A, 21B) described above. As shown in the figure, a plurality of first support members 21A are linked to each other along the lengthwise direction of the light guide plates 10 through a long rod-shaped connector 21f. Similarly, a plurality of second support members 21B are linked to each other through a long rod-shaped connector 21f. In this case, two ends of each connector 21f are integrally connected to respective intermediate parts of the shanks 21c, 21c. With this configuration, the plurality of support members 21 (21A, 21B) can be attached to the bottom plate 14a of the chassis 14 with greater ease than when attaching the plurality of support members 21 one by one. Also, it is possible to contribute to a reduction in number of components of the illumination device 4.

An embodiment of the present invention has been described above, but the present invention is not limited to such an embodiment, and it is apparent that the present invention can be implemented as various embodiments without departing from the scope of the present invention.

For example, in the above embodiment, holding parts 21a, 21b of the support members 21 (21A, 21B) were rectangular in a plan view, but the present invention is not limited to the above embodiment, and various shapes such as a circle, an ellipse, and a triangle may be employed. The light guide plate 10 had steps 10d, 10d formed along both longer side edges, but it is apparent that the present invention can be applied to a light guide plate that does not have such steps 10d, 10d.

Furthermore, the configuration in which the positioning pins 14c formed on the bottom plate 14a were provided as positioning members that allow the light guide plates 10 to be placed in proper positions on the bottom plate 14a was described, but the present invention is not limited to the above embodiment, and L-shaped protrusions that catch four corners of each light guide plate 10 may be provided on the bottom plate 14a as the positioning members.

The invention claimed is:

1. An illumination device, comprising:
a chassis that is in a rectangular box shape;
a plurality of light guide plates having a rectangular shape that is longer in a horizontal direction, the plurality of light guide plates being stored in the chassis and being arranged side by side on an inner bottom surface of the chassis;
light sources that illuminate light to shorter side end faces of the respective light guide plates such that said light enters the respective light guide plates; and
a plurality of support members that clamp the respective light guide plates on a surface of a bottom plate of the chassis,
wherein each of the support members has a holding part, a shank extending from the holding part, and a pair of locking pieces provided at an end of the shank, the holding part making contact with an upper surface of a longer side edge of each of the light guide plates, the pair of locking pieces being inserted and engaged in an attachment hole in the bottom plate and being elastically deformable toward and away from each other, and
wherein each of the light guide plates has a step formed along each longer side edge where an edge of an upper surface is removed and a recess is formed, the holding part of each of the support members makes contact with an upper surface of the step, and the light guide plate and the bottom plate of the chassis are held by a pressure between the holding part and the pair of locking pieces.

2. The illumination device according to claim 1, wherein the bottom plate of the chassis and each of the light guide plates both have a positioning hole formed therein for defining positions with respect to each other, and by inserting a positioning pin into said positioning holes, each of the light guide plates is fixed in a proper position on the surface of the bottom plate of the chassis.

3. The illumination device according to claim 1, wherein the pair of locking pieces of each of the support members is formed to face each other along a lengthwise direction of the light guide plates.

4. The illumination device according to claim 1, wherein the plurality of support members are connected to each other through a connector along a lengthwise direction of the light guide plates.

5. A liquid crystal display device, comprising:
the illumination device according to claim 1; and
a liquid crystal display panel that displays an image by using light from the illumination device.

* * * * *